Figures 1, 2:
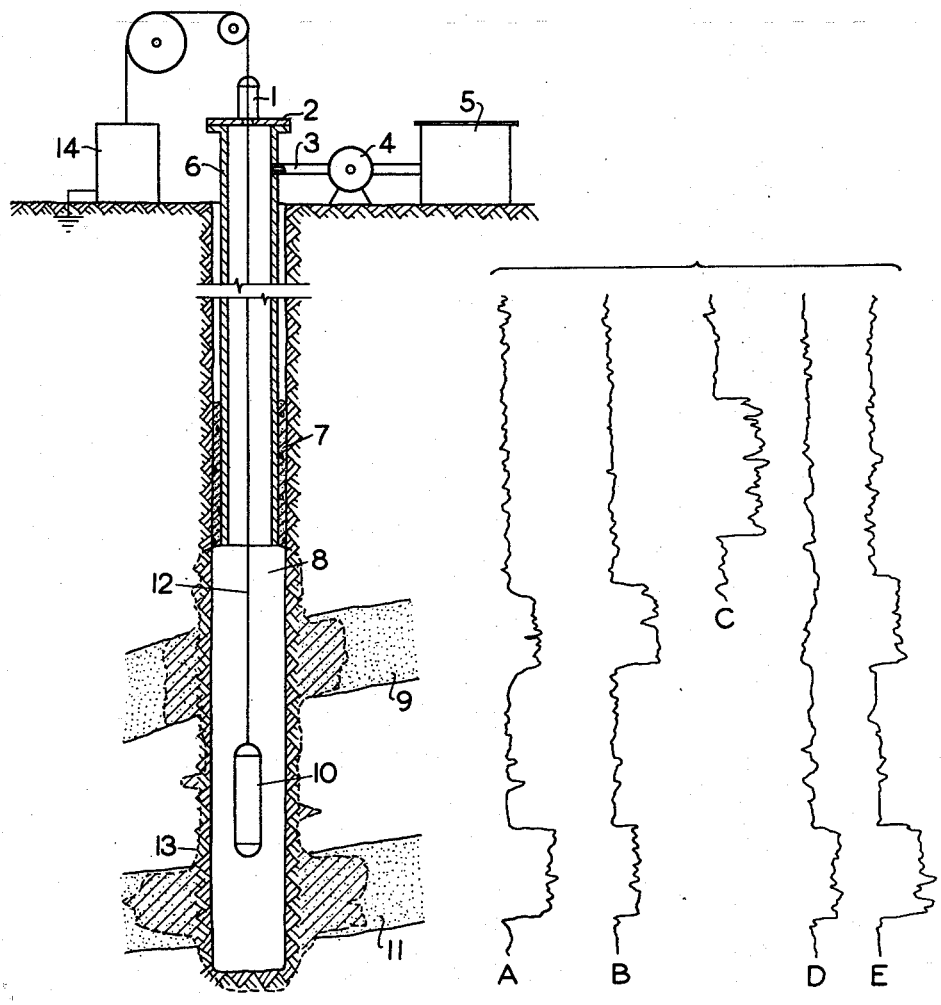

July 4, 1944.  M. M. ALBERTSON  2,352,993
RADIOLOGICAL METHOD OF LOGGING WELLS
Filed April 20, 1940

Inventor: Maurice M. Albertson
By his Attorney:

Patented July 4, 1944

2,352,993

UNITED STATES PATENT OFFICE 2,352,993

RADIOLOGICAL METHOD OF LOGGING WELLS

Maurice M. Albertson, Houston, Tex., assignor to Shell Development Company, San Francisco, Calif., a corporation of Delaware Application April 20, 1940, Serial No. 330,747

12 Claims. (Cl. 250—83.6)

This invention relates to methods of logging or coring wells, and pertains more particularly to radiological methods for determining the location, nature and characteristics of underground formations traversed by boreholes.

It is well known that coring is an essential operation attendant the drilling of oil wells. Cores obtained during drilling are carefully studied for various purposes, such as for correlating the various wells located within the boundaries of a given oil pool, or for determining the location and thickness of the formations which are of interest to the operators, such as oil- or gas-bearing layers, water-bearing layers which must be cemented or sealed off to prevent contamination, porous layers which should likewise be shut off to prevent excessive loss of drilling fluid, etc.

In view of the time loss and expenditures connected with mechanical coring operations, electrical coring or logging methods are at present extensively applied to oil wells, whereby the characteristics of the formations traversed by a borehole are electrically recorded in the form of so-called resistivity, porosity and lateral penetration logs.

The results obtained by either mechanical or electrical logging methods are, however, sometimes short of those desired. Thus, cores obtained from a particular cross-section of a formation traversed by the borehole may, for various reasons, not be truly representative of the properties or nature of said formation as a whole. For example, they may fail to indicate to the operator the presence of fissures, cavities or crevices in the formation wherein the drilling fluid is likely to be lost. Electrical coring methods give only indirect indications as to the nature of the strata traversed by a borehole, and electrical logs may therefore sometimes present inadequate or misleading information in this regard.

Various methods have also been lately proposed for carrying out surveys of boreholes by radiological means.

Thus, a Patent No. 2,197,453, granted on April 16, 1940, to Gerald L. Hassler, discloses a method of radiological logging by means of a detector adapted to be lowered in a borehole and comprising an ionization chamber or a Geiger-Mueller counter sensitive to radioactive radiations emanating from the various formation layers, and capable of transmitting indications of said radioactive effects to the metering apparatus at the surface.

A Patent No. 2,220,509, granted on November 5, 1940, to Folkert Brons, discloses another method of radiological logging, which consists in lowering into a borehole a source of neutron rays, allowing the neutrons to diffuse in the formation, wherein the degree of said diffusion is a function of the quantity of the free or bound hydrogen present in the formation, causing the diffused neutrons to act on a material disintegrating under the effect of the slow diffused neutrons, and determining the extent of said disintegration by means of a detector, the values obtained being thus indicative of the amount of hydrogen, and therefore substantially of the amount of water or hydrocarbons of which said hydrogen is a constituent, present in said formaion.

It is an object of the present invention to provide a further improvement in radiological methods of well logging, whereby a borehole to be surveyed is first pretreated by introducing thereinto, and, if desired, forcing into the formation zone surrounding said borehole, a material capable of modifying the natural radio-active effects to which a radiological detector is subjected when lowered in said borehole.

It is also an object of the present invention to provide a method for pretreating boreholes in such a manner that the formations traversed thereby may be readily differentiated from each other by radiological means with regard to such physical properties as porosity, permeability and character of natural liquid content.

It is also an object of this invention to provide a method for the radiological logging of cased boreholes.

The present invention will be understood from the following description taken with reference to the attached drawing wherein:

Fig. 1 is a diagrammatic representation of an oil well installation adapted for carrying out the present method; and Fig. 2 is an idealized diagram of various radiological graphs obtained by logging the well of Fig. 1 according to the present method.

Referring to the drawing, Fig. 1 shows a borehole 8 having in its upper portion a casing 6 cemented at 7. The casing may be tightly closed at the head 2, and a conduit 3 is used to connect the well with a tank 5 through a pump 4. The borehole 8 passes through layers 9 and 11 whose nature, location and depth it is desired to investigate.

The tank 5 is filled with a desired aqueous or non-aqueous liquid, such as water, brine, crude oil, absorption oil, kerosene, alcohols, ketones, nitrogen bases, pyridine, etc.

If it is desired to survey the well by means of a detector sensitive to radio-active radiations, for example, such as disclosed in the above-identified Hassler application, a radio-active tracer material is added to, and preferably dissolved in, said liquid, said material consisting of or comprising suitable salts or soaps prepared from radium-bearing ores, such as carnotite, or from artificially prepared or energized radio-active compounds, such as radio-active iron or radio-active cobalt, or any other radio-active isotopes (such, for example, as tabulated on pages 31–43, "Reviews of Modern Physics," volume 12, No. 1, January, 1940) properly selected with regard to their life-period, their commercial availability, and the type of radiation emitted thereby.

The liquid from tank 5 is pumped into the borehole, a suitable pressure being applied by means of pump 4 to force said liquid through the walls of the borehole into the formation to a certain radius around the borehole, as schematically indicated by the dotted line 13. The liquid comprising the radio-active tracer material is then withdrawn from the borehole by pumping or bailing, or by other suitable means, and may be replaced by a neutral liquid, such as water, oil, any drilling fluid, etc. The objective is to prevent the radio-active material remaining in the liquid contained in the borehole from obscuring the radiations from the portion of radio-active material forced into the walls of the borehole. Any suitable technique for this purpose may be utilized. If desired, pressure may be maintained on the well to prevent the liquid forced into the formation from flowing back into the well in any substantial amounts.

A detector 10 sensitive to radio-active radiations is then lowered throughout the borehole on a cable 12, a lubricator 1 being conveniently used if the well is kept under pressure.

Assuming the layer 11 to be an oil-bearing, and layer 9 to be a water-bearing layer, and assuming the liquid of tank 5 comprising the radio-active tracer material to be a mineral oil, such as crude oil or kerosene, a greater amount of the tracer liquid will penetrate into the layer 11 than into the layer 9 owing the immiscibility of oil with water. Since, as stated above, response of the indicator 10 is at any moment or level a function of the amount of the radio-active material placed into the formation in the proximity of the detector, the formation graph automatically or manually recorded by means of the indicating apparatus 14 electrically connected with the detector 10 by means of the cable 12, or drawn from the numerical indications of said apparatus, will appear as indicated by curve A in Fig. 2, that is, a greater deflection of the graph will be noted at the level of the layer 11 than at the level of layer 9. If, on the other hand, the tracer liquid used is of aqueous nature, such as water, a greater amount of penetration will occur in the layer 9 than in the layer 11, and the graph will appear as shown at B in Fig. 2, that is, with a greater deflection at the level of layer 9. In a similar way, by properly calibrating the detecting and indicating devices, for example, by means of test runs in wells of known stratigraphy, it is possible to distinguish between oil-bearing, water-bearing and porous or fissured layers, and between porous layers of differing permeability, and to determine the location and the vertical stretch of said layers.

It is obvious that the radio-active tracer material is not necessarily admixed to a liquid pumped into the well, but may be added to any solid or pasty material placed in the well by any desired means. For example, the radio-active tracer material may be added to the grease used to lubricate casing joints, whereby the exact location of any particular length of casing may be accurately determined, for example, for the purpose of perforating said casing. Likewise, radio-active tracer material may be added to the slurry used in cementing the casing, whereby the exact place where the casing is cemented may be determined from a log such as shown at C in Fig. 2.

When applying the present method for surveying a well by means of an apparatus such, for example, as disclosed in the above-identified Brons application, it is not necessary to add any tracer material to the liquid used to flood the zone adjacent the borehole. Since, as stated above, the Brons detector is responsive to the neutron diffusion phenomenon, which in turn is a function of the amount of free or bound hydrogen present in the formation, and, therefore, of the oil and water of the formation, the following procedure may be followed:

Assuming layer 9 to be a porous or fissured layer, and layer 11 to be oil-bearing layer, a run with the Brons detector may be effected prior to flooding the formation adjacent the well with the liquid from tank 5. In this case, the layer 9 being substantially dry, a characteristic response will be obtained from the detector only at the level of layer 11, as shown by curve D in Fig. 2. If, after this run, the formation is flooded with a liquid from tank 5, the log obtained by making a second run with the Brons detector will appear as shown by curve E in Fig. 2, since a considerable volume of liquid will be taken up by layer 9, and diffusion of neutrons will take place also at the level of said layer, causing a characteristic response of the detector at said level. In like manner, a characteristic differentiation between oil- and water-bearing layers may be achieved by selecting a flooding liquid having proper miscibility or immiscibility properties with regard to the fluids present in said layers, and by suitably calibrating the detecting apparatus, as explained above.

Should it be desired to log a borehole in which a string of casing had already been installed, this may be effected by perforating the casing throughout its entire depth, or at desired intervals, by means, for example, of a mechanical or gun perforator. The desired liquid may then be forced into the formation through the perforations, and the logging operations carried out as explained above. In a similar way, the present process may be carried out in casing strings provided with perforated sections, perforated liners, or screens, in a manner that will be understood by those familiar with operations attendant the production of petroleum.

Since the masking electrical or magnetic effects of the casing, while making electrical logging impracticable in cased wells, do not substantially interfere with radiological logging, the present method is therefore of special importance for surveying formations lying behind the casing string.

It may be noted that the type of the liquid, whether containing a radio-active tracer material or not, used for flooding the zone adjacent a borehole according to the present process, should preferably be selected in accordance with the character of the formations traversed by the borehole, or that portion of the borehole which it is desired to survey. For example, if it is desired to survey a portion of the borehole adjacent to, or passing through an oil-bearing layer, whose productivity may be impaired if an aqueous liquid, such as water or brine, is forced thereinto, the liquid used should preferably be of a non-aqueous type, such as those listed above. If it is desired to survey a portion of a well remote from the producing sands, or sealed therefrom by means of packers, as when determining the location and/or thickness of porous or water-bearing layers, the liquid injected into the formation may be of any desired type including water or brine.

I claim as my invention:

1. In a method for logging boreholes by means of a detector responsive to radio-active phenomena, the steps of introducing into a borehole and forcing into a formation zone adjacent the borehole a liquid comprising a radio-active tracer material, subsequently withdrawing said liquid from the borehole proper, lowering said detector into the borehole, and indicating the radio-active effects to which said detector is subjected by reason of the presence of a portion of said material in said formation zone.

2. In a method for logging boreholes by means of a detector responsive to radio-active phenomena, the steps of introducing into a borehole and forcing into a formation zone adjacent the borehole a liquid comprising a radio-active tracer material, subsequently withdrawing said liquid from the borehole proper, filling the borehole with a liquid having no radio-active properties, maintaining pressure on the well to prevent the liquid forced into the formation from flowing back into the borehole in substantial amounts, lowering said detector into the borehole and indicating the radio-active effects to which said detector is subjected by reason of the presence of a portion of said material in the formation zone.

3. The method of determining the porosity of the formations surrounding a bore hole drilled through those formations which comprises placing in said hole a fluid to which has been added a radioactive substance, exerting pressure on said fluid to force some of the fluid with the radio-active substance contained therein into said formations, removing the surplus fluid from the hole and subsequently measuring the intensity of the radioactivity of the formations.

4. The method of determining the porosity of the formations surrounding a borehole drilled through those formations which comprises placing in said hole a fluid to which has been added a radioactive substance, exerting pressure on said fluid to force some of the fluid with the radioactive substance contained therein into said formations, removing the surplus fluid from the hole, lowering through the hole an instrument capable of detecting variations in the intensity of the radioactivity of said formations and noting the depths at which said variations occur.

5. The method of determining the location of porous formations surrounding a borehole which comprises placing in said hole oil to which has been added a small quantity of a soap prepared from a radium-bearing ore, exerting pressure on said oil to force some of the oil with the soap contained therein into said formations, removing the surplus oil from the hole, and subsequently measuring the depth in the hole and the radioactive intensity of the formations.

6. Method of gauging the relative porosity of subterranean geological strata traversed by a well bore which comprises the steps of flushing the well bore with a liquid having radioactive characteristics in a manner such that quantities of said liquid are retained by subterranean strata, removing said material not thus retained, continuously measuring radioactivity within the well bore, and correlating the measurements so obtained with measurements of depth.

7. The method of determining the porosity of the formations surrounding a borehole drilled through those formations which comprises placing in said hole a fluid to which has been added a radioactive substance soluble in said fluid, exerting pressure on said fluid to force some of the radioactive substance contained therein into said formations, removing the surplus fluid from the hole and subsequently measuring the intensity of the radioactivity of the formations.

8. Method of gauging the relative porosity of subterranean strata traversed by a well bore which comprises the steps of flushing the well bore with a liquid having radioactive characteristics in a manner such that quantities of said liquid are retained by subterranean strata, replacing said liquid within the borehole with a liquid not having radioactive characteristics, continuously measuring radioactivity within the well bore, and correlating the measurements so obtained with measurements of depth.

9. Method of gauging the relative porosity of subterranean strata traversed by a well bore which comprises the steps of flushing the well bore with a mineral oil having radioactive characteristics in a manner such that quantities of said radioactive oil are retained by subterranean strata, replacing said radioactive oil within the borehole with a mineral oil not having radioactive characteristics, continuously measuring radioactivity within the well bore, and correlating the measurements so obtained with measurements of depth.

10. The method of determining the location of porous formations surrounding a borehole which comprises placing in said borehole a mineral oil having a small quantity of a radioactive soap added thereto, exerting pressure on said oil to force some of the oil with the soap contained therein into said formations, replacing said radioactive oil within the borehole with a mineral oil not having radioactive characteristics, and subsequently effecting measurements of radioactive intensity within the borehole and correlating said measurements with measurements of depth.

11. Method of gauging the relative porosity of subterranean strata traversed by a well bore which comprises the steps of flushing the well bore with a liquid having radioactive characteristics, said liquid being substantially free of finely divided solid matter suspended therein, in a manner such that quantities of said liquid are retained by subterranean strata, replacing said liquid within the borehole with a liquid not having radioactive characteristics, continuously measuring radioactivity within the well bore, and correlating the measurements so obtained with measurements of depth.

12. The method of determining the location of porous formations surrounding a borehole which comprises placing in said borehole a mineral oil substantially free of finely divided solid matter suspended therein and having a small quantity of a radioactive soap added thereto, exerting pressure on said oil to force some of the oil with the soap contained therein into said formations, replacing said radioactive oil within the borehole with a mineral oil not having radioactive characteristics, and subsequently effecting measurements of radioactive intensity within the borehole and correlating said measurements with measurements of depth.

MAURICE M. ALBERTSON.